(12) United States Patent
Krumm

(10) Patent No.: US 7,321,838 B2
(45) Date of Patent: Jan. 22, 2008

(54) RELATIVE RANGE CAMERA CALIBRATION

(75) Inventor: John C. Krumm, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/382,022

(22) Filed: May 6, 2006

(65) Prior Publication Data

US 2006/0195292 A1    Aug. 31, 2006

Related U.S. Application Data

(60) Continuation of application No. 11/237,405, filed on Sep. 27, 2005, now Pat. No. 7,113,885, which is a division of application No. 10/927,373, filed on Aug. 25, 2004, now Pat. No. 7,003,427, which is a continuation of application No. 09/543,235, filed on Apr. 5, 2000, now Pat. No. 6,789,039.

(51) Int. Cl.
*G01C 17/00*    (2006.01)

(52) U.S. Cl. .......................................... 702/94

(58) Field of Classification Search .................. 702/94, 702/150
See application file for complete search history.

(56) References Cited

U.S. PATENT DOCUMENTS 5,905,568 A *  5/1999  McDowell et al. ............ 356/28

6,839,081 B1 *  1/2005  Iijima et al. .................. 348/46

OTHER PUBLICATIONS http://www.answers.com/topic/least-squares, p. 1-4.*
E. Kruse and F.M. Wahl, Camera-based-observation of obstacle motions to derive statistical data for mobile robot motion planning, IEEE 1998, p. 662-667.*
http://www.m-w.com/dictionary/interpolate, p. 1.*

* cited by examiner

*Primary Examiner*—Tung S. Lau
(74) *Attorney, Agent, or Firm*—Lyon & Harr, L.L.P.; Craig S. Fischer

(57) ABSTRACT

Method and system for measuring a relative position and orientation of range cameras using a movement of an object within a scene. In general, the method and system determine the relative pose between two cameras by measuring a path the movement of the object makes within a scene and calculating transformation parameters based on these measurements. These transformation parameters are used to determine the relative position of each camera with respect to a base camera. The system and method include other novel features, such as a data synchronization feature that uses a time offset between cameras to obtain the transformation parameters, and a technique that improves the robustness and accuracy of solving for the transformation parameters, and an interpolation process that interpolates between sampled points if there is no data at a particular instant in time.

18 Claims, 8 Drawing Sheets

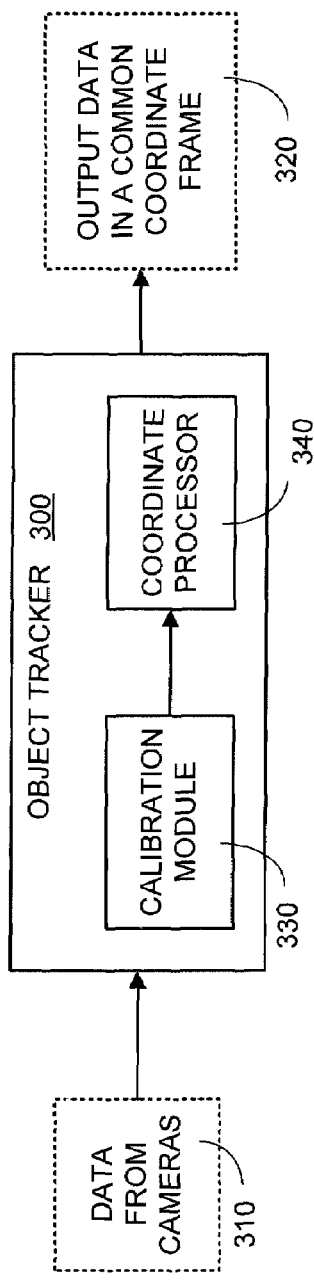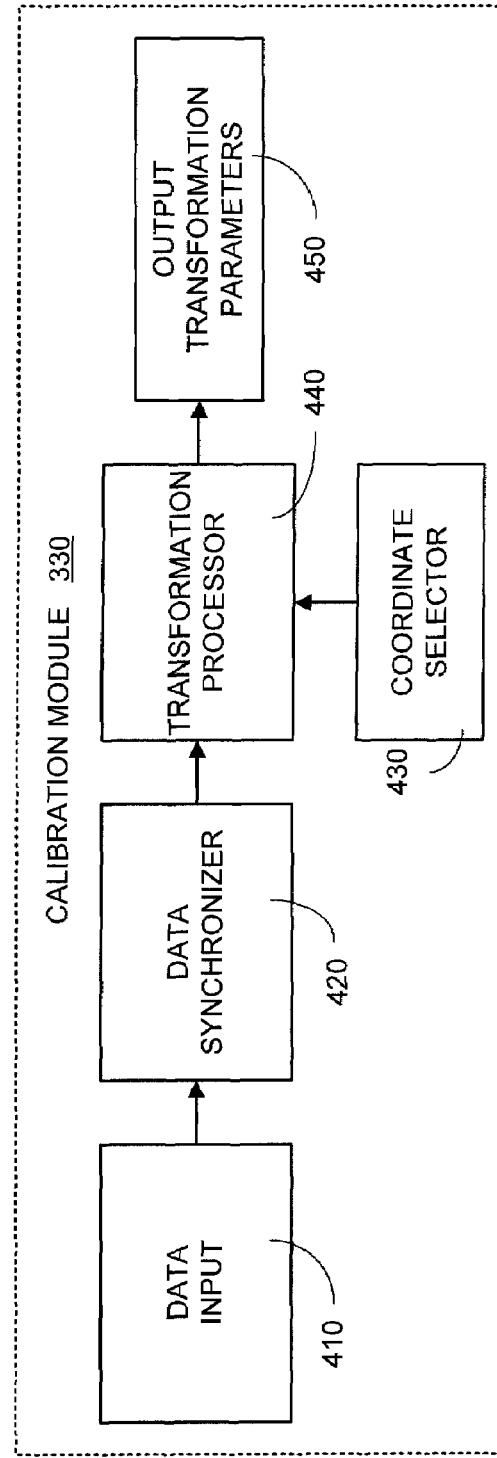

RELATIVE RANGE CAMERA CALIBRATION

CROSS REFERENCE TO RELATED APPLICATIONS

This application is a continuation application of U.S. Ser. No. 11/237,405, entitled "Relative Range Camera Calibration," filed Sep. 27, 2005, now U.S. Pat. No. 7,113,885 which is a divisional application of Ser. No. 10/927,373 filed on Aug. 25, 2004, now U.S. Pat. No. 7,003,427, entitled "Relative Range Camera Calibration," issued Feb. 26, 2006, which is a continuation of patent application Ser. No. 09/543,235, filed Apr. 5, 2000, now U.S. Pat. No. 6,789,039, entitled "Relative Range Camera Calibration," issued Sep. 7, 2004, whereby the entire contents of each of these documents is hereby incorporated by reference.

BACKGROUND

Range imaging systems are used in a variety of applications to determine the three-dimensional (3-D) characteristics of a scene (a scene is an environment of interest). By way of example, these applications include 3-D scene reconstruction, 3-D object recognition, robot navigation, terrain mapping and object tracking. An important component of a range imaging system is a range camera. A range camera is a device that is used to measure a 3-D structure of a scene by providing range (or depth) information as measured from a plane on the camera. Thus, while a black and white camera provides a grayscale intensity of each pixel and a color camera provides a color of each pixel, a range camera provides a range (or distance to the 3-D scene) of each pixel. Range cameras use a variety of techniques to measure range including lasers, projected light patterns and stereo vision.

For some applications (such as tracking persons within a scene) the range imaging system may include more than one range camera because a single range camera may not have a sufficiently large field of view to monitor the entire scene. In order for multiple range cameras to work together, however, the cameras must be calibrated to determine a position and an orientation of each camera relative to one of the cameras (known as a relative pose). This calibration of multiple cameras enables the ranging system to convert 3-D measurements obtained from each camera into a common coordinate frame. For example, a path of a person in a scene may be measured by each camera in its local coordinate frame and converted to a common coordinate frame (such as a room-based coordinate system).

Several types of manual calibration techniques are used to calibrate the range cameras. One type of calibration technique uses a three-dimensional calibration chart to determine the relative position of each camera. This technique, however, is difficult to use and time-consuming because it requires that the calibration chart be positioned correctly within a scene.

Another type of calibration technique requires a user to monitor a scene and determine a plurality of reference points in the scene until the relative position of each camera can be determined. For example, a user references a number of common points in a scene (within each camera's field of view) and, if enough of these common points are found, the relative pose of the cameras may be determined. One disadvantage of this technique, however, is that it is difficult to implement in a consumer-based product because it is unlikely the consumer would want to perform such a complicated and time-consuming calibration process. Moreover, with both types of calibration techniques, if the consumer performed the calibration process improperly any results obtained from the range imaging system would be erroneous.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention disclosed herein includes a relative range camera calibration system and method for determining a relative position and orientation of a plurality of range cameras using spatial movement. In particular, a path of an object is measured by each range camera in the camera's local coordinate frame. Thus, the path of the object is observed by each camera but, because each camera has a different view of the object's path, the object path is reported by each camera in different local coordinate frames.

The system and method determine the relative location of each range camera by converting the object path as measured in each of the local coordinate frames to a common coordinate frame. The common coordinate frame may be, for example, with respect to one of the cameras or with respect to the scene (such as a room-based coordinate system).

In general, the novel method disclosed herein includes measuring a path of an object in a scene as observed by each camera, performing matching of points of the path and obtaining transformation parameters (such as an offset distance ( )x, )y) and a rotation angle (2)), preferably by solving a system of transformation equations. These transformation parameters are used to determine the relative position of each camera. Moreover, the method includes other novel features such a data synchronization feature that uses a time shift between cameras to obtain the transformation parameters. In addition, the method includes a unique process that improves the robustness and accuracy of solving the system of transformation equations by using a process that is less sensitive to outlying points. For example, in some embodiments the relative range camera calibration system and method includes uses a least median of squares technique to reduce the sensitivity of the solution to points extremely removed from the correct solution. The system and method also include an interpolation process that interpolates between sampled points if there is no data at a particular instant in time. Further, relative range camera calibration system and method includes a system for determining a relative position and orientation of range cameras using spatial movement that incorporates the method disclosed herein.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 3 is a general block diagram of the object tracker of the relative range camera calibration system and method.

FIG. 4 is a block diagram illustrating the calibration module of the object tracker shown in FIG. 3.

DETAILED DESCRIPTION

In the following description of the relative range camera calibration system and method, reference is made to the accompanying drawings, which form a part thereof, and in which is shown by way of illustration a specific example whereby the relative range camera calibration system and method may be practiced. It is to be understood that other embodiments may be utilized and structural changes may be made without departing from the scope of the claimed subject matter.

I. Exemplary Operating Environment

Figure 1:
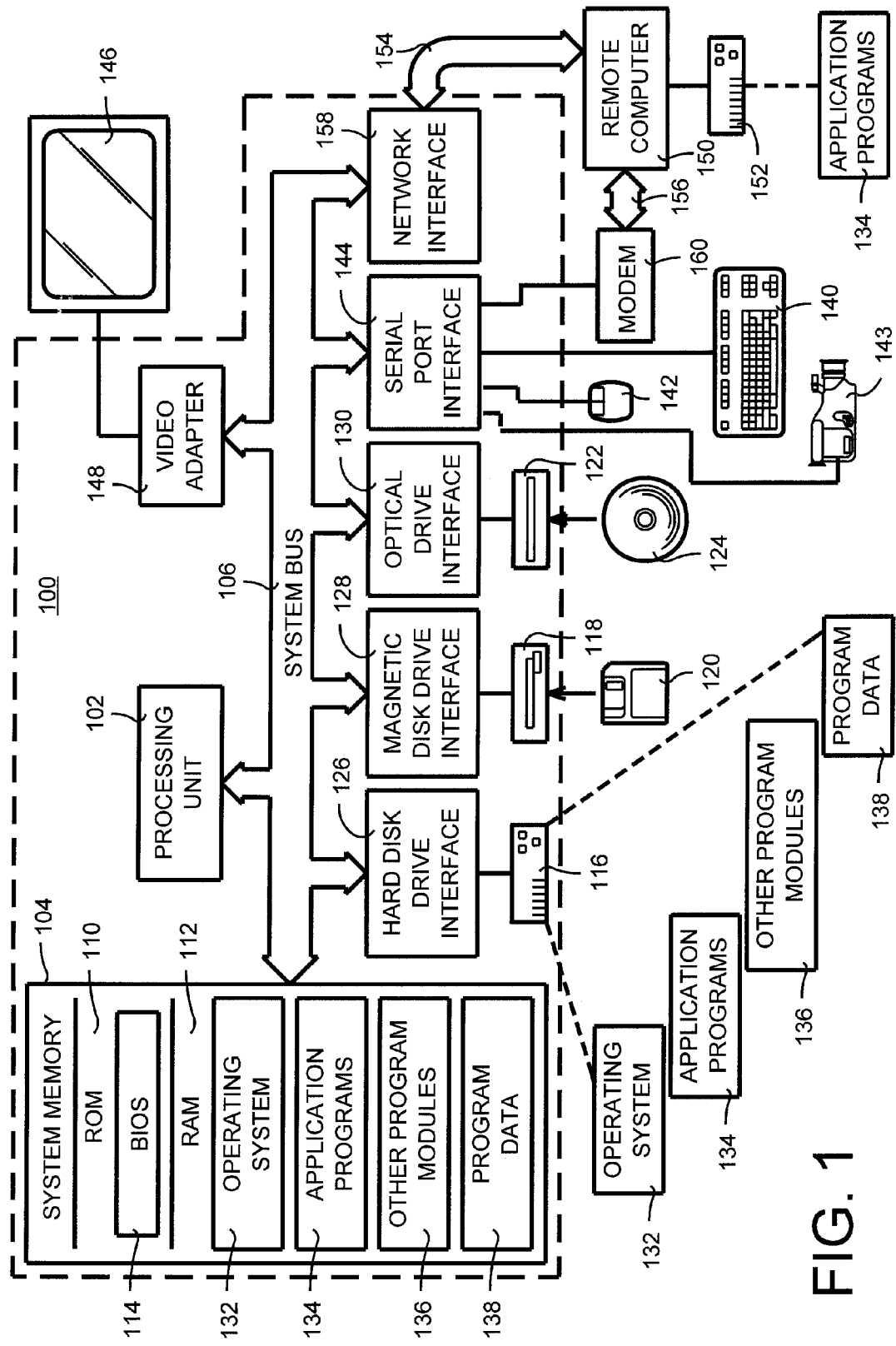
FIG. 1 is a block diagram illustrating an apparatus for carrying out the relative range camera calibration system and method.

FIG. 1 and the following discussion are intended to provide a brief, general description of a suitable computing environment in which the relative range camera calibration system and method may be implemented. Although not required, the relative range camera calibration system and method will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the relative range camera calibration system and method may be practiced with a variety of computer system configurations, including personal computers, server computers, hand-held devices, multiprocessor systems, microprocessor-based or programmable consumer electronics, network PCs, minicomputers, mainframe computers, and the like. The relative range camera calibration system and method may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the relative range camera calibration system and method includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

The relative range camera calibration system and method include measuring the relative position and orientation of at least two range cameras. Range cameras, which are used to measure the 3-D structure of a scene, give the range (or depth) of each pixel. In order for two or more range cameras to work properly together, the system (such as a range imaging system) using the range cameras must be able to determine a relative position and orientation of each camera. This process of determining a relative pose of each camera (also known as calibration) enables the system to convert 3-D measurements from each camera into a common coordinate frame. Data from each camera is in the camera's local coordinate frame, and calibration of each camera makes the 3-D measurements from different cameras (in different local coordinate frames) consistent with each other.

The relative range camera calibration system and method measures a relative pose between a plurality of range cameras by measuring a relative pose between two cameras at a time. One camera is designated as a base camera and relative poses of the remainder of the cameras can be measured relative to the base camera. In general, the relative range camera calibration system and method calibrates range cameras based on a path of an object around a scene. The object path is determined in a ground plane (such as a floor of a room) as a function of time as measured by a range camera. The relative range camera calibration system and method determines the transformation parameters that take a point on the object path measured by a non-base camera and convert it to a point as it would be seen from the base camera. In addition, the relative range camera calibration system and method includes synchronizing data obtained from each camera, interpolating between sampled data points and using a robust error minimization technique to determine the transformation parameters.

III. General Overview

Figure 2:
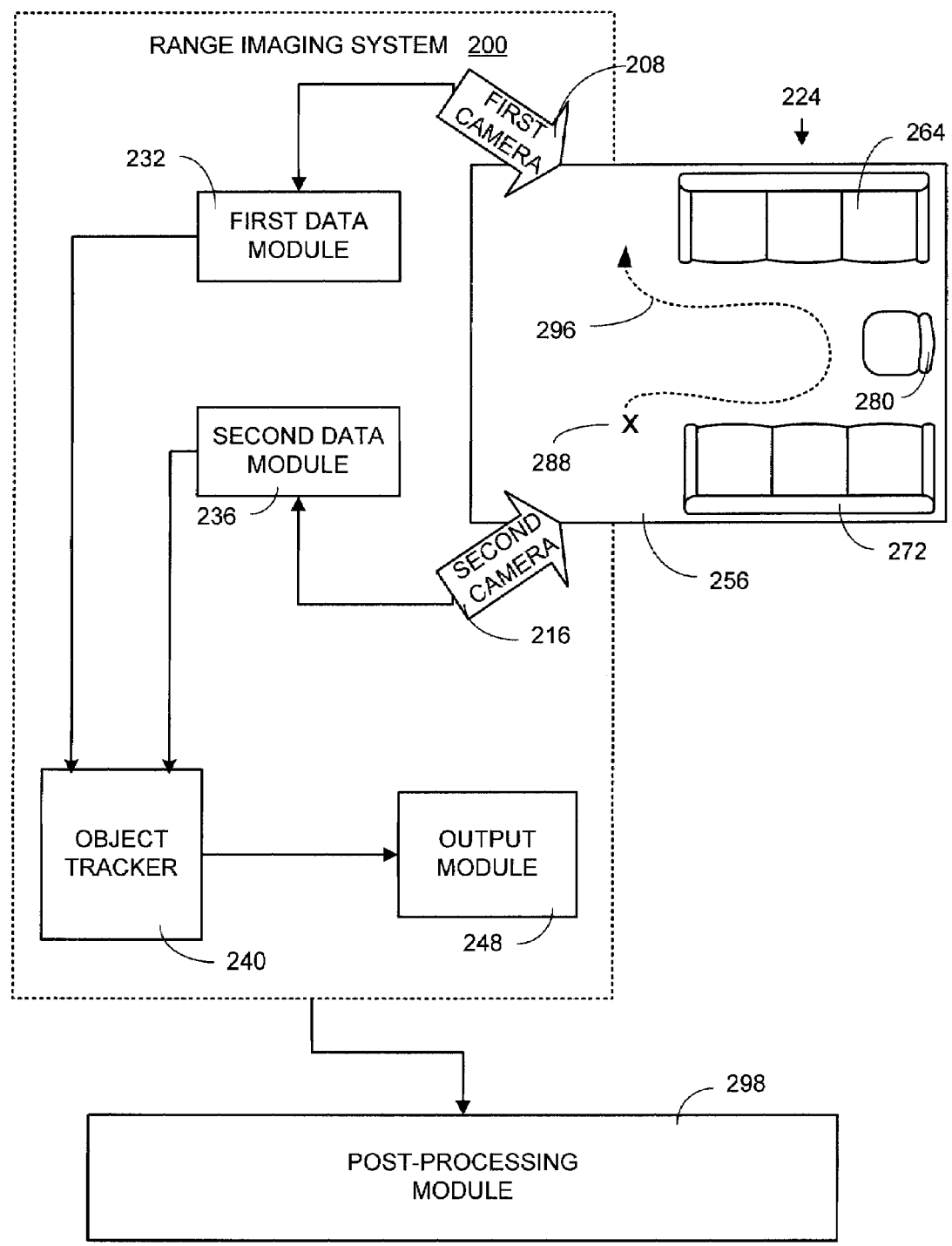
FIG. 2 is an overall block diagram of a range imaging system incorporating the system and method disclosed herein.

As shown in FIGS. 2-10 for the purposes of illustration, the invention is embodied in a method and a system for measuring a relative position and orientation of range cameras using a movement of an object within a scene. FIG. 2 is an overall block diagram of a range imaging system incorporating the relative range camera calibration system and method. The range imaging system illustrated is only one example of several systems that could incorporate the relative range camera calibration method and system. In general, the range imaging system 200 includes a first camera 208 and a second camera 216. Each of the cameras 208, 216 may use any of the various techniques available to measure range, such as, for example, lasers, projected light patterns and stereo vision. Both of the cameras 208, 216 are directed toward a scene 224 and are capable of measuring a 3-D structure of the scene 224.

The range imaging system also includes a first data module 232 that samples raw position data from the first camera 208 and a second data module 236 that samples raw position data from the second camera 216. These data modules 232, 236 may be, for example, computers or microprocessors. The first camera 208 supplies position data about the scene 224 in a first local coordinate frame and the second camera 216 supplies position data about the scene 224 in a second local coordinate frame. These two local coordinate frames generally are not the same, and calibration of the two cameras 208, 216 is necessary to express the position data from each camera in a common coordinate frame.

The sampled data from each camera is sent to an object tracker 240, which inputs the sampled data, calibrates the cameras 208, 216 and performs a coordinate transformation of the data. Further, an output module 248 is included in the range imaging system 200 that outputs scene data in a common coordinate system (such as a room-based coordinate system). In this example, the scene 224 includes a room 256 containing a first sofa 264 on one side of the room 256 and a second sofa 272 opposite the first sofa 264. In addition, a chair 280 is situated between to sofas 264, 272.

In this range imaging system, calibration of the range cameras 208, 216 generally is performed by having a person 288 (denoted by an "X") move in a path 296 around the room 256. This path 296 is observed by the cameras 208, 216 in their respective local coordinate frames and the raw position data (such as (x,y) coordinates) of the path 296 is sampled by the data modules 232, 236. The data modules 232, 236 sample raw position data from each camera that includes the object path 296 described in a first local coordinate frame (as observed by the first camera 208) and the object path 296 described in a second local coordinate frame (as observed by the second camera 216).

The object tracker 240 receives the sampled data from the data modules 232, 236 and, using the relative range camera calibration system and method, calibrates cameras 208, 216 by determining the relative position and orientation of each camera. Once the cameras 208, 216 are calibrated any data from the cameras 208, 216 is converted into a common coordinate frame. This means, for example, a path of an object around the room 256 is expressed by the object tracker 240 in a common coordinate frame. The object tracker 240 sends data in a common coordinate frame to the output module 248, for output from the range imaging system 200. Further, the range imaging system 200 may transmit the data to a post-processing module 298 that may include, for example, a three-dimensional (3-D) scene reconstruction system, a 3-D object recognition system or a 3-D tracking system (which may be part of a vision-based computer interface system).

IV. Component Overview

FIG. 3 is a general block diagram of the object tracker 300 (the object tracker 240 in FIG. 2 is one example of the object tracker 300) of the relative range camera calibration system and method. In general, position data from cameras (box 310) in local coordinate frames is received by the object tracker 300, processed and data is sent as output in a common coordinate frame (box 320). The object tracker 300 includes a calibration module 330, which determines transformation parameters that will transform position data in local coordinate frames into a common coordinate frame, and a coordinate processor 340, which uses the transformation parameters computed by the calibration module 330 to transform data observed by the cameras into a desired common coordinate frame.

FIG. 4 is a block diagram illustrating the calibration module 330 of the object tracker 300 shown in FIG. 3. The calibration module determines transformation parameters that are used to convert data in a local coordinate frame of each camera into a common coordinate frame. In general, data from each camera is received as input (box 410) and a data synchronizer 420 is used to synchronize the data received from multiple cameras. A coordinate selector 430 determines the desired coordinate frame of the transformation. For example, a first camera may be selected as the base camera and data from the other cameras are expressed in the coordinate frame of the base camera. A transformation processor 440 computes transformation parameters that convert data from a local coordinate frame to be expressed in the base coordinate frame. These transformation parameters are sent as output (box 450) of the calibration module 330.

Figure 5:
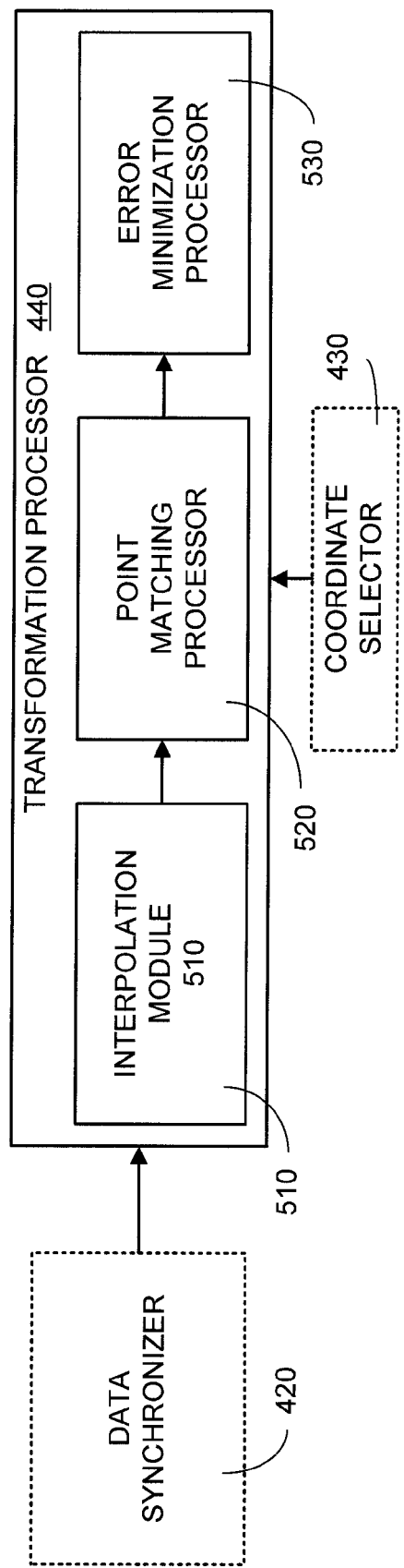
FIG. 5 is a block diagram illustrating the transformation processor the calibration module shown in FIG. 4.

FIG. 5 is a block diagram illustrating the transformation processor 440 the calibration module shown in FIG. 4. The transformation processor 440 includes an interpolation module 510, for interpolating between data points, a data matching processor 520, for matching up data points from different cameras at a certain time, and an error minimization processor 530, for determining the data points that yield the most accurate transformation parameters. The transformation processor 440 inputs synchronized data from the data synchronizer 420. A time is then selected by the interpolation module 510 along with position data corresponding to that time. If there was no data point sampled by the data modules at the selected time then the interpolation module 510 interpolates a data point, as described further below.

The data points at the selected time are received by the data matching processor 520. In addition, the data matching processor 520 receives a desired coordinate frame as determined by the coordinate selector 430. The desired coordinate frame may be, for example, chosen by the user or selected at random. Any data from the cameras is expressed in the selected coordinate frame (also called the base coordinate frame). The data matching processor 520 matches data points at the selected time and computes transformation parameters using the data points. The error minimization processor 530 determines which data points give the most accurate transformation parameters.

V. Details of the Components and Operation

Figure 6:
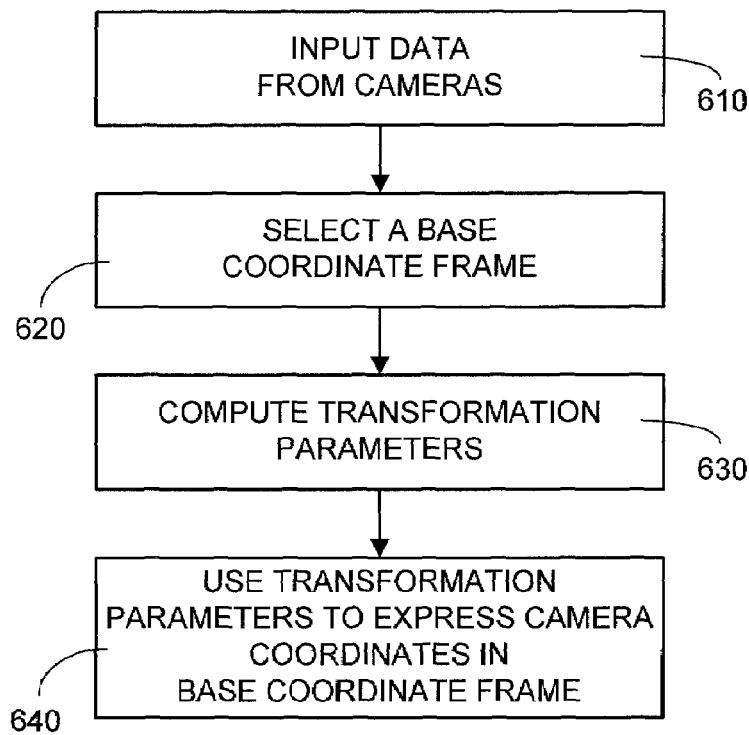
FIG. 6 is a general flow diagram of the operation of the calibration module of the relative range camera calibration system and method.

FIG. 6 is a general flow diagram of the operation of the calibration module 330 of the relative range camera calibration system and method. Generally, data observed by cameras is received as input (box 610). Depending on the application there may be two or more cameras, with each camera positioned to observe data within a scene. Even if there are more than two cameras, however, the calibration method only needs to measure the relative position and orientation between two cameras at a time. This is because one camera is designated as the base camera and the position and orientation of the remainder of the cameras are measured from that base camera. The raw data from each camera is sampled and sent to the calibration module 330 and the sampled data from each camera in its respective local coordinate frame.

One of the cameras is selected as the base camera and the coordinate frame of chosen camera becomes the base coordinate frame (box 620). Transformation parameters are computed (box 630) from the sampled data received by the calibration module 330. These transformation parameters are then used to express data received from each camera in the base coordinate frame. Once this calibration process is performed, any data observed by a non-base camera can be expressed in the base coordinate frame as if the data had been observed by the base camera.

Figures 7A, 7B, 7C:
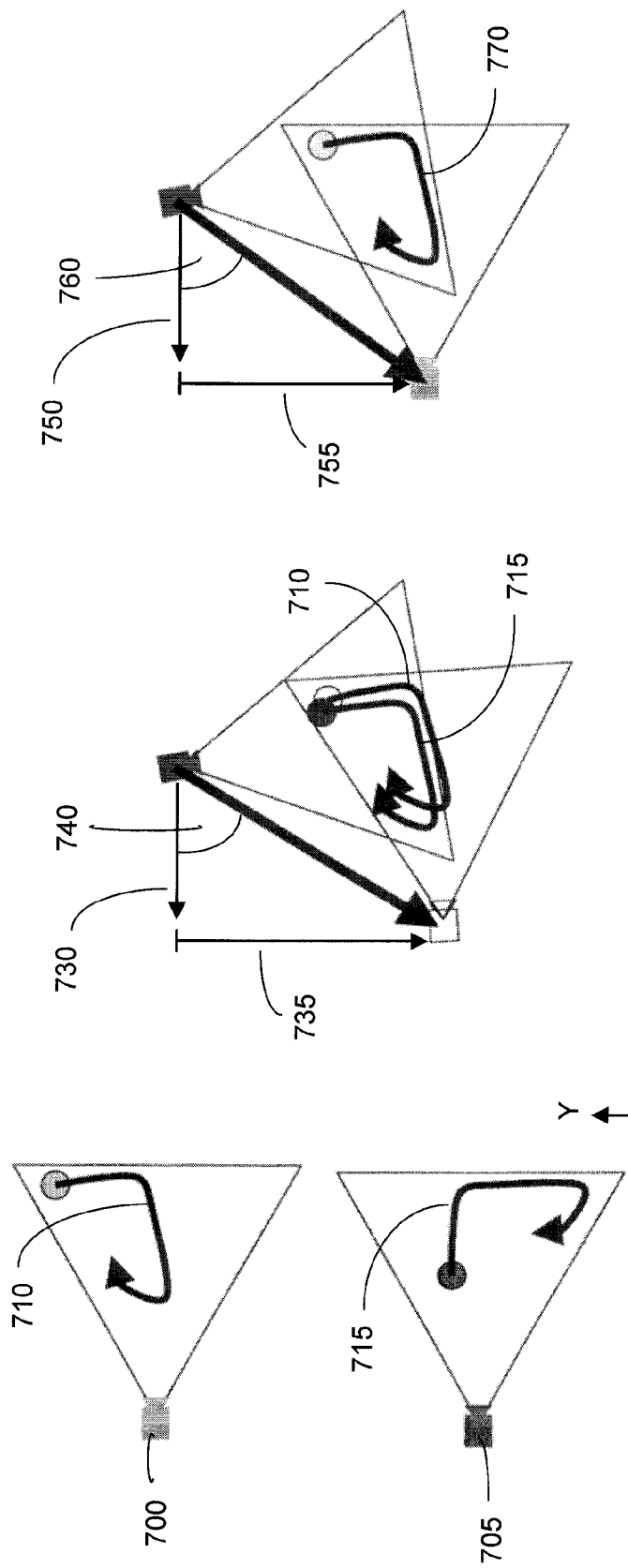
FIG. 7A-7C are general block diagrams illustrating exemplary operations of the calibration module shown in FIG. 4.

FIGS. 7A-7C are general block diagrams illustrating the operations of the transformation parameters computed by the calibration module 330 shown in FIG. 4. In FIG. 7A, a first camera 700 and a second camera 705 observe an object path in a scene. A first object path 710 is observed by the first camera 700 in a first local coordinate frame and a second object path 715 is observed by the second camera in a second local coordinate frame. It should be noted that two cameras 700, 705 observe the same path but in different local coordinate frames.

FIG. 7B illustrates a set of transformation parameters computed by the calibration module 330 applied to the data of the second camera 705. In particular, local coordinate frame of the first camera 700 has been selected as the base coordinate frame and, in accordance with the relative range camera calibration system and method disclosed herein, one purpose of the calibration module 330 is to compute transformation parameters that cause the second object path 715 to overlap with the first object path 710 as closely as possible. The transformation parameters include a change in the "x" coordinate ($\Delta x$) 730, a change in the "y" coordinate ($\Delta y$) 735 and an angle of rotation ($\theta$) 740. As shown in FIG. 7B, when the transformation parameters ($\Delta x$, $\Delta y$, $\theta$) are applied to the second object path 715, the first object path 710 and second object path 715 nearly overlap. The lack of exact overlap is due to a slight amount of error in the calculation of the transformation parameters.

FIG. 7C illustrates another set of transformation parameters computed by the calibration module 330 applied to the data of the second camera 705. In FIG. 7C the transformation parameters $\Delta x^*$ 750, $\Delta y^*$ 755 and $\theta^*$ 760 are used to achieve an exact overlap of the first object path 710 and the second object path 715 into a single object path 770. The exact overlap represents minimum error in the transformation parameters ($\Delta x^*$, $\Delta y^*$, $\theta^*$) and means that these transformation parameters can be used to express data from the second camera 705 in the base coordinate frame.

Figure 8:
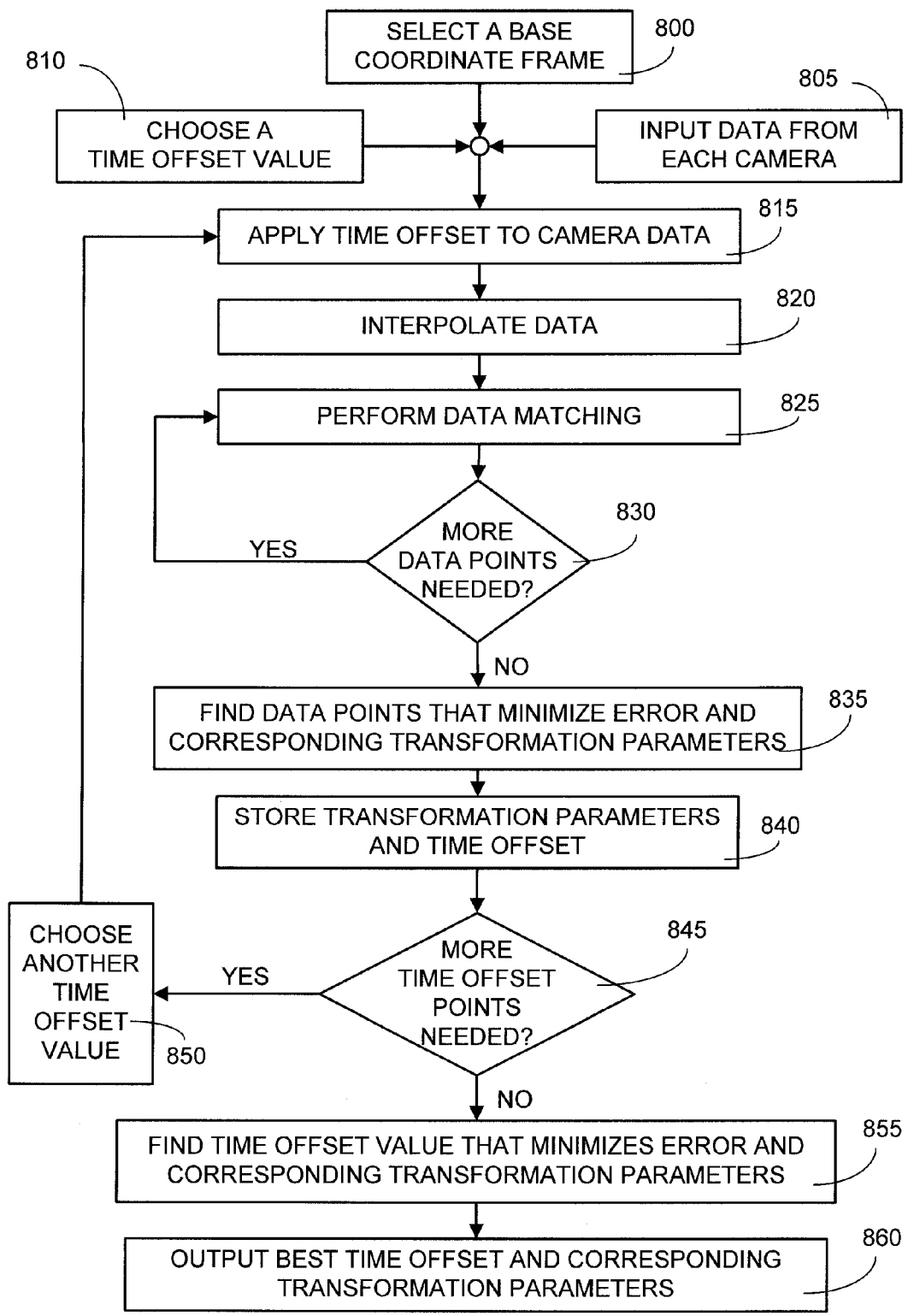
FIG. 8 is a detailed flow diagram illustrating one embodiment of the relative range camera calibration system and method.

FIG. 8 is a detailed flow diagram illustrating an embodiment of the relative range camera calibration system and method. In this embodiment, the relative range camera calibration system and method designates one of a plurality of cameras as a base camera and measures the relative pose of the remainder of the cameras with respect to the base camera. Initially, one camera is selected as a base camera and that camera's local coordinate frame becomes the base coordinate frame (box 800). Moreover, data from each camera is received as input (box 805).

Before this data can be used to compute transformation parameters, however, at least two problems must be overcome. The first problem occurs if the clocks on the computers used to sample the data are unsynchronized by a constant time offset so that equivalent time readings on the computers do not correspond to the same actual time. The relative range camera calibration system and method corrects this problem by adding a time offset to the data. In particular, a time offset value is chosen (box 810) and applied to the camera data (box 815) in order to synchronize the data. The second problem occurs if the data from the cameras is not sampled at the same time leaving, for example, a data point at time t from a first camera without a corresponding data point from a second camera.

The relative range camera calibration system and method corrects this problem by performing a linear interpolation (box 820) between two data points sampled before and after time t. This linear interpolation approximates where a data point would have been seen at time t. Next, data matching is performed to provide enough data points to compute the corresponding transformation parameters. Data matching matches data from different cameras at certain absolute times and uses these data points to compute transformation parameters.

Figure 9A:
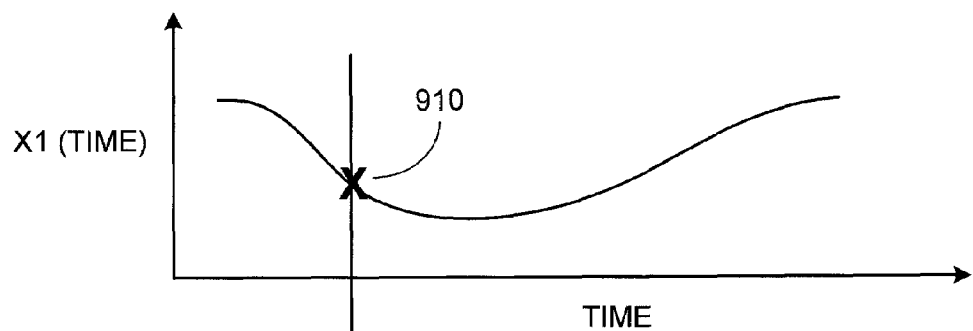
FIGS. 9A-9D illustrate an example of how the system and method can perform data matching.
Figure 9B:
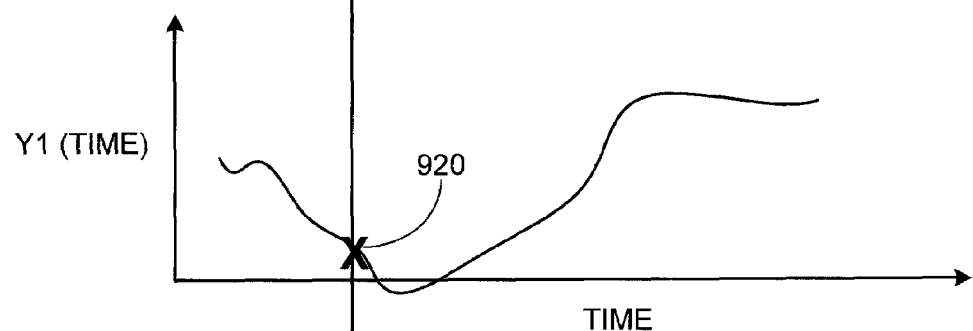
Figure 9C:
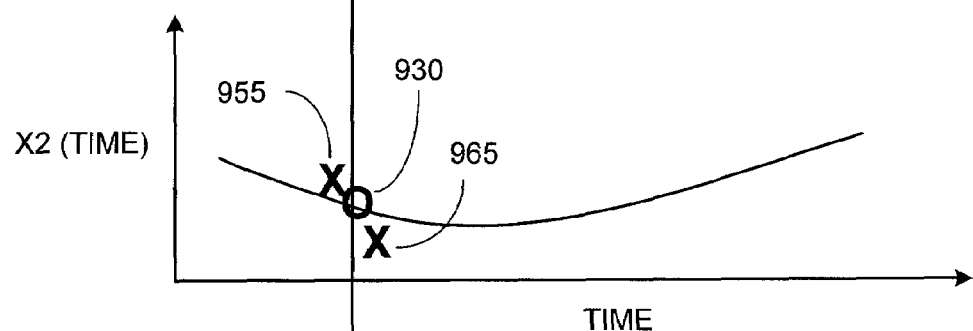
Figure 9D:
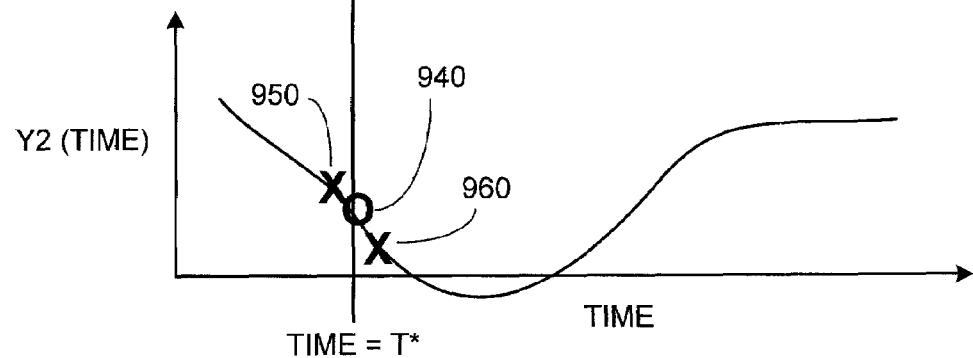

FIGS. 9A-9D illustrate an example of how the relative range camera calibration system and method can perform data matching. In particular, data from a first camera (camera 1) in a first local coordinate frame ($x_1$, $y_1$) and data from a second camera (camera 2) in a second coordinate frame ($x_2$, $y_2$) are graphed as a function of time. FIG. 9A illustrates a graph of $x_1$ versus time, FIG. 9B illustrates a graph of $y_1$ versus time, FIG. 9C illustrates $x_2$ versus time and FIG. 9D illustrates $y_2$ versus time. A time T* is selected such that there is data available at T* from, for example, camera 1. At time T*, the $x_1$ and $y_1$ coordinates from camera 1 (assuming that camera 1 was selected) will be perfectly synchronized, but there may be no data (i.e. ($x_2$, $y_2$)) available from camera 2. In this situation, data from camera 1 at time T* is matched such that a first point 910 on the $x_1$ versus time graph (or a second point 920 on the $y_1$ versus time graph) are matched with a third point 930 on the $x_2$ versus time graph and a fourth point 940 on the $y_2$ versus time graph. Note that in FIGS. 9C and 9D there are no sampled data points from camera 2 at time T*. The relative range camera calibration system and method performs an interpolation and chooses sampled data points 950, 955 prior to T* and sampled data points 960, 965 after T*. These sampled points 950, 955, 960, 965 are used to interpolate values of $x_2$ and $y_2$ at time T* to obtain the third and fourth data points 930, 940. Once the data has been matched at a certain time, the relative range camera calibration system and method determines whether more data points are needed (box 830). If so, then a different time is chosen and data matching is performed (box 825) at that time. Otherwise, if there are enough data points, an error minimization technique is used to find the data points that give the transformation parameters with the least error (box 835).

For example, the relative range camera calibration system and method may determine minimum error by using a least squares technique that is discussed by S. Ma and Z. Zhang in "Computer Vision" (Chinese Academy of Science, 1998), the entire contents of which are hereby incorporated by reference. In one embodiment, however, the relative range camera calibration system and method uses a least median of squares technique to determine minimum error. The least median of squares technique is more robust and less affected by data points that lie well away from the majority of data points. The least median of squares technique is discussed in detail by P. J. Rousseeuw and A. M. Leroy in "Robust Regression and Outlier Detection" (New York: John Wiley and Sons, 1987), the entire contents of which are hereby incorporated by reference.

When the transformation parameters with the least amount of error have been determined, they are stored along with the time offset value used to synchronize the data (box 840). Next, a determination is made whether more time offset points are needed (box 845). If more are needed, then another time offset value is selected (box 850) and the process begins again at box 815. Otherwise, an error minimization technique is used to find the time offset value with the least amount of error (box 855). As before, the least median of squares technique is one technique to determine the minimum error.

Figure 10:
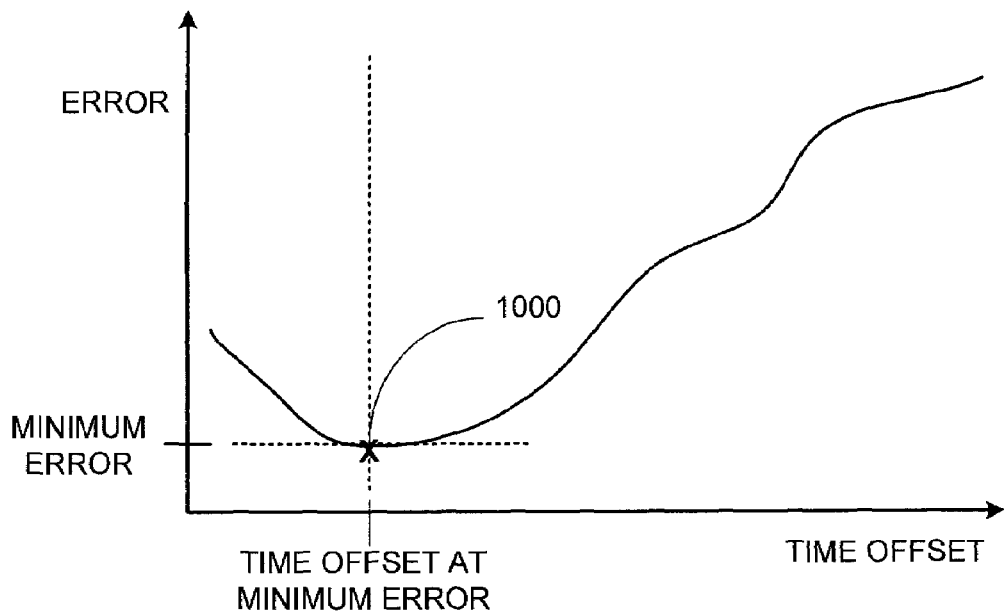
FIG. 10 illustrates an example of how the system and method can determine an accurate time offset value.

FIG. 10 illustrates an example of how the relative range camera calibration system and method can determine an accurate time offset. Specifically, the error for each time offset values is determined and plotted as shown in FIG. 10. A point 1000 at which a minimum error occurs a corresponding time offset value is noted. When the time offset value at minimum error is determined, both the time offset value and the corresponding transformation parameters are sent as output (box 860).

It should be noted that in some embodiments the transformation parameters are changes in the x and y coordinates and the rotation angle (such as $\Delta x$, $\Delta y$, $\theta$). In addition, other transformation parameters may be used depending on the type of coordinate systems used (such as, for example, polar coordinate systems).

VI. Working Example

The following working example uses a range imaging system to track the movement of a person around a room and is provided for illustrative purposes only. In this working example, the relative range camera calibration system and method are used to calibrate two range cameras in prior to using the range imaging system. As mentioned above, a variety of techniques (such as lasers and projected light patterns) are available for measuring range. Although in general the relative range camera calibration system and method is capable of using any ranging technique, in this working example stereo cameras were used. Stereo cameras were chosen because of their fast frame rate and because they are inexpensive and safe. In this working example, the application was tracking people as they move around a room. Further, two range cameras (camera 1 and camera 2) were used and calibrated based on a person's path when the person walked around the room.

The calibration process began by determining an (x,y) location of the person on a ground plane (in this working example, the floor of the room) as a function of time as measured by each range camera. This was accomplished using a technique described in co-pending U.S. patent application Ser. No. 09/455,822 entitled "A System and Process for Locating and Tracking a Person or Object in a Scene Using a Series of Range Images" by Barry Brumitt, filed on Dec. 6, 1999, the entire contents of which are hereby incorporated by reference. The relative range camera calibration system and method then chose a first camera as the base camera and designated the location measured by the base camera as ($x_1$,$y_1$) and a corresponding point from a second (non-base) camera (camera 2) as ($x_2$,$y_2$). The relative range camera calibration system and method was used to calibrate the two cameras by computing the transformation parameters of an angle $\theta$ and an offset ($\Delta x$,$\Delta y$) that made the following equation true:

$$\begin{pmatrix} x_1 \\ y_1 \\ 1 \end{pmatrix} = \begin{bmatrix} \cos(\theta) & -\sin(\theta) & \Delta x \\ \sin(\theta) & \cos(\theta) & \Delta y \\ 0 & 0 & 1 \end{bmatrix} \begin{pmatrix} x_2 \\ y_2 \\ 1 \end{pmatrix}$$

Once the values of $\theta$ and ($\Delta x$,$\Delta y$) were determined, using this equation, any point seen by camera 2, ($x_2$,$y_2$) could be transformed into the coordinates of camera 1 ($x_1$,$y_1$). This means that a point as seen by camera 2 could be expressed in the local coordinate frame of camera 1 as if the point was actually seen by camera 1.

In order to synchronize the data coming from the first and second cameras, a time offset $\Delta t$ was used to correct for the fact that a clock on the computer associated with the first camera (clock 1) was not synchronized with a clock on the computer associated with the second camera (clock 2). Thus, the points from the first camera and the second camera became ($x_{1i}$,$y_{1i}$,$t_{1i}$) and ($x_{2j}$,$y_{2j}$,$t_{2j}$+$\Delta t$), respectively. An initial guess of the time offset $\Delta t$ was chosen and a point from each camera was sampled. Because the sampled points from each camera did not exactly match up with each other, the data obtained from the second camera was interpolated as follows.

First, for every point in from the first camera taken at time $t_{1i}$, two points from the second camera were found that were taken as close as possible on either side of that time (i.e., points $j^-$ and $j^+$ were found such that $t_{2j^-}+\Delta t < t_{1i} < t_{2j^+}+\Delta t$). Next, a linear interpolation was performed on the two points from the second camera, $(x_{2j^-}, y_{2j^-})$ and $(x_{2j^+}, y_{2j^+})$, to approximate where the point would have been had it been seen at time $t_{1i}$. If, for any point in the first data set, surrounding points in the second data set could not be found, that point in time was ignored. After ignoring such points and after interpolation, there was a set of corresponding (x,y) points that were designated as $(x^*_{1k}, y^*_{1k}, x^*_{2k}, y^*_{2k})$, $1 \leq k \leq n$. The time data in this data set was ignored because it made no difference in the subsequent computations.

Next, point matching was performed and the transformation parameters corresponding to the least squared error was selected. Specifically, in this working example the least median of squares technique was used because it is a robust method. This method was implemented by picking random pairs of corresponding points from the data set $((x^*_{1k}, y^*_{1k}, x^*_{2k}, y^*_{2k})$, $1 \leq k \leq n$. A pair of points was the minimum number needed to compute the candidate transformation parameters (i.e., $\theta$ and $(\Delta x, \Delta y)$). The two pairs of randomly chosen points were $(x^*_{1a}, y^*_{1a})$, $(x^*_{1b}, y^*_{1b})$, $(x^*_{2a}, y^*_{2a})$, $(x^*_{2b}, y^*_{2b})$, and the angle $\theta$ was computed as $$\Delta x_a = x^*_{2a} - x^*_{1a}$$
$$\Delta y_a = y^*_{2a} - y^*_{1a}$$
$$\Delta x_b = x^*_{2b} - x^*_{1b}$$
$$\Delta y_b = y^*_{2b} - y^*_{1b}$$
$$\cos(\theta) = \frac{\Delta y_a \Delta y_b + \Delta x_a \Delta x_b}{\Delta x_b \Delta x_b + \Delta y_b \Delta y_b}$$
$$\sin(\theta) = \frac{\Delta x_b \Delta y_a - \Delta x_a \Delta y_b}{\Delta x_b \Delta x_b + \Delta y_b \Delta y_b}$$
$$\theta = \tan^{-1}(\sin(\theta)/\cos(\theta))$$

and the translation $(\Delta x, \Delta y)$ was:

$$\Delta i\ x = x^*_{1a} - x^*_{2a} \cos(\theta) + y^*_{2a} \sin(\theta)$$

$$\Delta i\ y = y^*_{1a} - x^*_{2a} \sin(\theta) - y^*_{2a} \cos(\theta)$$

This $\theta$ and $(\Delta x, \Delta y)$ served as a trial solution for the calibration problem based on the two randomly chosen pair of points. The solution was evaluated by computing a list of the squared errors between corresponding points:

$$e_k = (x^*_{1k} - x^*_{2k} \cos(\theta) + y^*_{2k} \sin(\theta) - \Delta x)^2 + (y^*_{1k} - x^*_{2k} \sin(\theta) - y^*_{2k} \cos(\theta) - \Delta y)^2$$

The quality of the solution was the median value of this list of squared errors. In this working example, our implementation, 100 random pairs of corresponding points were chosen and the transformation parameters $\theta$ and $(\Delta x, \Delta y)$ that corresponded to the least median of squares were used.

The least median of square technique was used as above to compute the best $\theta$ and $(\Delta x, \Delta y)$ for a whole series of values of a time offset value ($\Delta t$). Whichever $\Delta t$ gave the minimum least median of squares was chosen as the best one, and the corresponding $\theta$ and $(\Delta x, \Delta y)$ were used for the final solution.

As an alternative to the least median of square technique described above, a least square solution could have been used to determine a minimum error. The least squares solution to the calibration problem computes the transformation parameters $\theta$ and $(\Delta x, \Delta y)$ that minimize the sum of the Euclidean distances between corresponding points in $(x^*_{1k}, y^*_{1k}, x^*_{2k}, y^*_{2k})$, $1 \leq k \leq n$. The angle, $\theta$, is given by:

$$\tan(\theta) = \frac{\sum_{k=1}^{n} ((x^*_{2k} - \overline{x}^*_2)(y^*_{1k} - \overline{y}^*_1) - (y^*_{2k} - \overline{y}^*_2)(x^*_{1k} - x^*_1))}{\sum_{k=1}^{n} ((x^*_{1k} - \overline{x}^*_1)(x^*_{2k} - \overline{x}^*_2) + (y^*_{1k} - \overline{y}^*_1)(y^*_{2k} - \overline{y}^*_2))}$$

The above equation depends on the following equation, which computes the centroids of the points from each camera $$(\overline{x}^*_1, \overline{y}^*_1) = \frac{1}{n}\left(\sum_{k=1}^{n} x^*_{1k}, \sum_{k=1}^{n} y^*_{1k}\right)$$

$$(\overline{x}^*_2, \overline{y}^*_2) = \frac{1}{n}\left(\sum_{k=1}^{n} x^*_{2k}, \sum_{k=1}^{n} y^*_{2k}\right)$$

The translation $(\Delta x, \Delta y)$ is then given by $$\begin{pmatrix} \Delta x \\ \Delta y \end{pmatrix} = \begin{pmatrix} \overline{x}^*_1 \\ \overline{y}^*_1 \end{pmatrix} - \begin{bmatrix} \cos(\theta) & -\sin(\theta) \\ \sin(\theta) & \cos(\theta) \end{bmatrix} \begin{pmatrix} \overline{x}^*_2 \\ \overline{y}^*_2 \end{pmatrix}$$

The $\theta$ and $(\Delta x, \Delta y)$ computed are the solution to the calibration problem.

The quality (or amount of error) of the solution is given by the average squared distance between corresponding points:

$$e_2 = \frac{1}{n} \sum_{k=1}^{n} [(x^*_{1k} - x^*_{2k}\cos(\theta) + y^*_{2k}\sin(\theta) - \Delta x)^2 + (y^*_{1k} - x^*_{2k}\sin(\theta) - y^*_{2k}\cos(\theta) - \Delta y)^2]$$

For a series of values of the time offset, $\Delta t$, the transformation parameters $\theta$, $(\Delta x, \Delta y)$ and $e_2$ are computed. The average squared distance between corresponding points, $e_2$, will be a minimum for some value of $\Delta t$. We take the corresponding values of $\theta$ and $(\Delta x, \Delta y)$ at the minimum value of $\Delta t$ as the solution to the calibration problem.

This least squares solution works well in spite of small errors in tracking the position of the person in the room. However, there can be outlier points due to gross errors in the process that tracks the person. These outlier points are (x,y) locations that deviate greatly from the actual location of the person. In this case, the least squares solution will be drawn away from the right answer, and the a technique that is robust to such errors should be used, such as the least median of square technique described above.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A calibration system for calibrating a first range camera and a second range camera, comprising:
   a first data point sampled before a time t using the first range camera;
   a second data point sampled after time t using the first range camera;
   an interpolation module that interpolates a data point at time t using the first data point and the second data point such that the interpolated data point approximates where a data point would have been seen at time t;
   a data matching processor that matches the interpolated data point with data sampled from the second range camera to calibrate the first and the second range cameras;
   an error minimization processor that uses synchronized data to compute transformation parameters having a minimum error; and
   an output module that expresses data captured by the first range camera and the second range camera in a base coordinate frame using the transformation parameters and without the use of calibration targets or charts.

2. The calibration system of claim 1, wherein the data is obtained from the range cameras measuring a path of a moving object.

3. The calibration system of claim 1, wherein the interpolation module uses linear interpolation to obtain the interpolated data point.

4. The calibration system of claim 1, further comprising a data synchronizer that synchronizes data sampled from the first range camera with data sampled from the second range camera.

5. The calibration system of claim 1, further comprising a coordinate selector that selects a base coordinate system for use in the calculation of the transformation parameter.

6. The calibration system of claim 4, wherein the data synchronizer uses a time offset value to synchronize the data and the time offset value is used by the error minimization processor to compute the transformation parameter.

7. A computer-implemented method for calibrating range cameras, comprising:
   inputting data captured by the range cameras, wherein the captured data includes a path of a moving person;
   synchronizing data captured by one range camera with data captured by another range camera; and
   matching synchronized data from each of the range cameras to calibrate the range cameras and storing the matched synchronized data in a memory of a general-purpose computing device;
   computing transformation parameters from the synchronized data; and
   expressing data captured by the range cameras in a base coordinate frame using the transformation parameters and without the use of calibration targets or charts.

8. The computer-implemented method of claim 7, further comprising:
   selecting one of the range cameras as a base camera;
   selecting as a base coordinate frame a coordinate frame of the base camera; and
   measuring a position and orientation between any one of the range cameras and the base camera.

9. The computer-implemented method of claim 7, wherein synchronizing data further comprises adding a time offset value to the captured data.

10. The computer-implemented method of claim 7, further comprising:
    sampling two data points from the captured data, wherein the first data point is sampled before a time t and the second data point is sampled after the time t; and
    linearly interpolating a data point at time t using the first and second data points.

11. The computer-implemented method of claim 7, further comprising using a least median of squares minimization technique to find data points in the synchronized data that give transformation parameters having a least amount of error.

12. A method for calibrating a first range camera and a second range camera, comprising:
    sampling a first data point before a time t and a second data point after time t using the first range camera;
    interpolating a data point between the first data point and the second data point to obtain an interpolated data point at time t such that the interpolated data point approximates where a data point would have been seen at time t; and
    using the interpolated data point and data sampled by the second range camera to find and store transformation parameters on a general-purpose computing device; and
    expressing data captured by the first range camera and the second range camera in a base coordinate frame using the transformation parameters and without the use of calibration targets or charts;
    wherein the transformation parameters are used to achieve calibration of the first and second range cameras.

13. The method of claim 12, further comprising:
    the first range camera to capture first camera data and using the second range camera to capture second camera data; and
    applying a time offset to the first camera data and the second camera data.

14. The method of claim 12, wherein the first camera data and the second camera data include a person moving around in a path.

15. The method of claim 13, further comprising synchronizing the first and second camera data with each other to obtain synchronized data.

16. The method of claim 15, further comprising performing data matching of the synchronized data to achieve calibration of the first and second range cameras.

17. The method of claim 14, further comprising:
    finding data points in the first and second camera data that represent a minimum error; and
    finding transformation parameters using the data points representing the minimum error; and
    using the transformation parameters to calibrate the first and second range cameras.

18. The method of claim 17, further comprising using a least median of squares technique to determine the data points representing the minimum error.

* * * * *